(12) United States Patent
Liang

(10) Patent No.: US 9,501,581 B2
(45) Date of Patent: Nov. 22, 2016

(54) METHOD AND APPARATUS FOR WEBPAGE READING BASED ON MOBILE TERMINAL

(75) Inventor: Jie Liang, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 343 days.

(21) Appl. No.: 14/114,558

(22) PCT Filed: Dec. 21, 2011

(86) PCT No.: PCT/CN2011/084335
§ 371 (c)(1),
(2), (4) Date: Oct. 29, 2013

(87) PCT Pub. No.: WO2012/155512
PCT Pub. Date: Nov. 22, 2012

(65) Prior Publication Data
US 2014/0380144 A1    Dec. 25, 2014

(30) Foreign Application Priority Data

May 18, 2011    (CN) .......................... 2011 1 0131372

(51) Int. Cl.
*G06F 17/00* (2006.01)
*G06F 17/30* (2006.01)
(Continued)

(52) U.S. Cl.
CPC ......... *G06F 17/30896* (2013.01); *G06F 17/24* (2013.01); *G06F 17/30902* (2013.01); *H04L 67/10* (2013.01)

(58) Field of Classification Search
CPC .................................................. G06F 17/30902
(Continued)

(56) References Cited

U.S. PATENT DOCUMENTS

| 5,878,223 A * | 3/1999 | Becker | G06F 17/30902 707/E17.12 |
| 7,047,485 B1 * | 5/2006 | Klein | G06F 17/30902 707/E17.12 |

(Continued)

*Primary Examiner* — Mohammed-Ibrahim Zuberi
(74) *Attorney, Agent, or Firm* — Anova Law Group, PLLC

(57) ABSTRACT

A webpage reading method based on a mobile terminal is provided. The method includes: based on an input web address, loading current webpage contents corresponding to the web address from a webpage server and displaying the loaded webpage contents; when loading the current webpage contents, detecting whether a pre-reading keyword is included in an HTML file or DOM; when the pre-reading keyword exists, determining whether a percentage of the displayed contents with respect to entire current webpage contents reaches or exceeds a pre-set threshold value; when the percentage reaches or exceeds the pre-set threshold value, pre-reading and caching the next webpage contents based on a web address associated with the pre-reading keyword; and when a pre-set condition of displaying next webpage contents is satisfied, displaying the next webpage contents. The method pre-reads the next webpage contents before all current webpage contents are displayed and displays promptly the next webpage contents after a user finishes reading the current webpage contents, thereby reducing the time spent in waiting for reading the next webpage contents so as to improve the reading experience of the user.

16 Claims, 13 Drawing Sheets

(51) Int. Cl.
*G06F 17/24* (2006.01)
*H04L 29/08* (2006.01)

(58) Field of Classification Search
USPC .......................................................... 715/205
See application file for complete search history.

(56) References Cited

U.S. PATENT DOCUMENTS

| | | | | |
|---|---|---|---|---|
| 7,392,348 B2* | 6/2008 | Dumont | ............ | G06F 17/30902 707/E17.12 |
| 7,565,450 B2* | 7/2009 | Garcia-Luna-Aceves | ................ | G06F 12/1483 709/217 |
| 8,219,633 B2* | 7/2012 | Fainberg | ............ | G06F 17/30902 709/200 |
| 8,539,338 B2* | 9/2013 | Zhu | .................... | G06F 17/30902 715/200 |
| 8,645,501 B2* | 2/2014 | Ghosh | ................ | H04L 61/1511 709/203 |
| 8,892,608 B2* | 11/2014 | Blinnikka | ......... | G06F 17/30902 707/803 |
| 9,058,402 B2* | 6/2015 | Ehrlich | ............. | G06F 17/30902 |
| 9,075,893 B1* | 7/2015 | Jenkins | ............. | G06F 17/30902 |
| 9,294,582 B2* | 3/2016 | Tuliani | ................ | H04L 67/2842 |
| 9,307,003 B1* | 4/2016 | Sebastian | .......... | G06F 17/30902 |
| 2002/0055966 A1* | 5/2002 | Border | ............. | G06F 17/30902 709/200 |
| 2002/0194434 A1* | 12/2002 | Kurasugi | .......... | G06F 17/30902 711/137 |
| 2003/0191812 A1* | 10/2003 | Agarwalla | ........ | G06F 17/30902 709/217 |
| 2004/0010621 A1* | 1/2004 | Afergan | ............ | G06F 17/30902 709/247 |
| 2004/0128346 A1* | 7/2004 | Melamed | .......... | G06F 17/30902 709/203 |
| 2005/0055426 A1* | 3/2005 | Smith | ............... | G06F 17/30902 709/219 |
| 2005/0108517 A1* | 5/2005 | Dillon | ............... | G06F 17/30902 713/150 |
| 2006/0230030 A1* | 10/2006 | Volpa | ................. | G06F 17/30905 |
| 2007/0006067 A1* | 1/2007 | Kikuchi | ............ | H04M 1/72561 715/205 |
| 2007/0156852 A1* | 7/2007 | Sundarrajan | ...... | G06F 17/30902 709/219 |
| 2007/0192444 A1* | 8/2007 | Ackaouy | ............ | H04L 67/2852 709/219 |
| 2007/0250601 A1* | 10/2007 | Amlekar | ............ | G06F 17/30902 709/219 |
| 2008/0114773 A1* | 5/2008 | Choi | ................. | G06F 17/30864 |
| 2008/0228772 A1* | 9/2008 | Plamondon | ....... | G06F 17/30902 |
| 2008/0228864 A1* | 9/2008 | Plamondon | ....... | G06F 17/30902 709/203 |
| 2009/0083494 A1* | 3/2009 | Bhanoo | ............. | G06F 17/30902 711/141 |
| 2012/0084343 A1* | 4/2012 | Mir | ..................... | H04L 29/12066 709/203 |
| 2013/0120460 A1* | 5/2013 | Adams | .................... | G06T 13/80 345/660 |

\* cited by examiner

Mail[1] is a major way of everyday communication. Therefore, it is very important for people to know how to properly write mails, send mails, read mails and reply mails. Understanding mail writing methods and skills helps you and your team members save a lot of time, greatly improving work efficiency.

cite:
[1]: http://xxxx.com/mail.html

FIG. 2

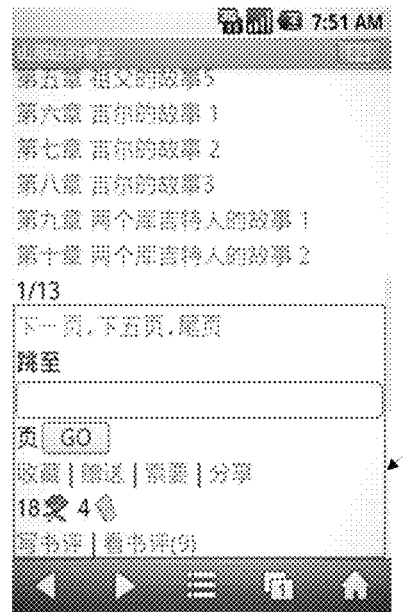
FIG. 10
Original webpage (with webpage footer, turning page is required)
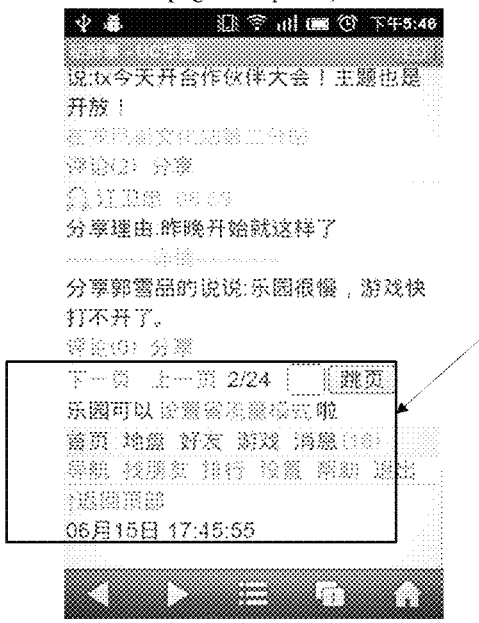
Modified webpage by splicing (without webpage footer, turning page is not required)
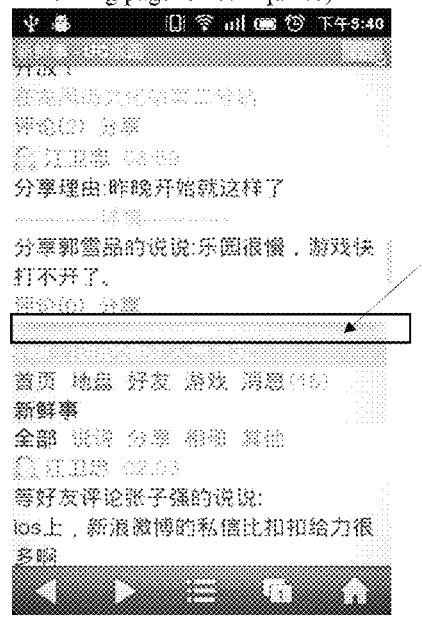
FIG. 11A  FIG. 11B

Original webpage (with webpage footer, turning page is required)
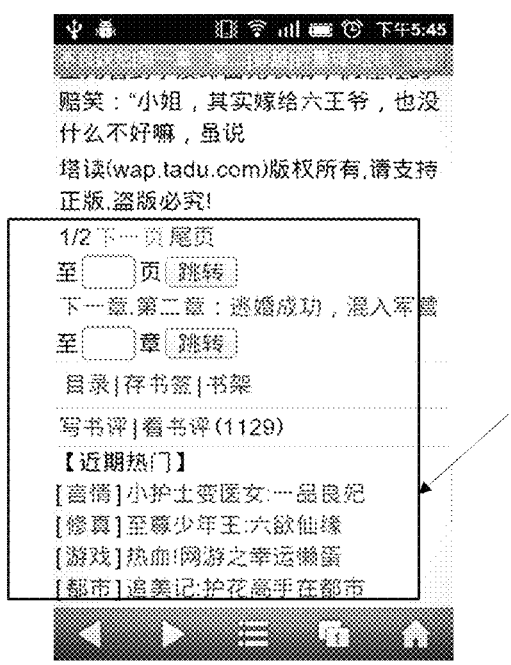
Modified webpage by splicing (without webpage footer, turning page is not required, easy to read)
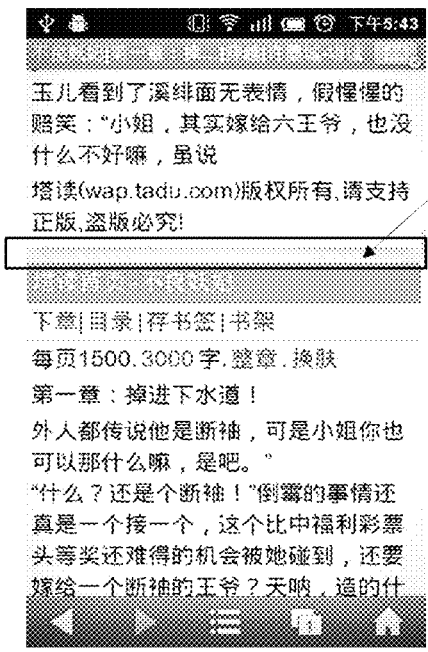
FIG. 12A
FIG. 12B
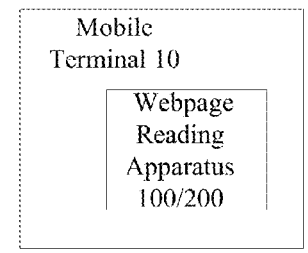
FIG. 13

METHOD AND APPARATUS FOR WEBPAGE READING BASED ON MOBILE TERMINAL

FIELD OF THE INVENTION

This application is a national stage patent application of PCT Application No. PCT/CN2011/084335, filed on Dec. 21, 2011, which claims the priority of Chinese Patent Application No. 201110131372.4, filed on May 18, 2011, the entire contents of all of which are incorporated by reference herein.

The present invention generally relates to mobile communication field and, more particularly, to a method and apparatus for webpage reading based on mobile terminal and mobile terminal including webpage reading apparatus.

BACKGROUND

With the rise in popularity of the Internet, people are becoming more and more used to reading books, articles, and viewing photos on the Internet through the use of webpage browsing functionality provided by the Internet. A book consists of many pages, and a long article may also be divided into several pages. When a user finishes reading a page and prepares to read the next page on the display screen of a terminal (e.g., computers, mobile phones), or the user finishes browsing a photo in a series of photos and then prepares to view the next photo, the user must click a paging tag (e.g., Next Page) at the bottom of the webpage to request an Internet service by using a website address corresponding to the paging tag. Then, the user can read the contents of the next page or browse the next photo through the Internet. The Internet requested operation takes a certain period of time. Especially when the network condition is busy, the operation may take much longer, thus interrupting the user's webpage reading or photo browsing. The user cannot continuously and smoothly read webpages or view photos, thus negatively affecting the user's reading experience.

In addition, webpages on the Internet usually include webpage header, webpage navigation links, webpage footer, related webpage links, webpage body content, webpage interaction information, advertising information, etc. The contents of a webpage include many hyperlinks, not simply browsing information. For example, a user may browse webpages by touch mode. When the user is ready to turn the next page through the touch of a finger on the touch screen of a mobile terminal, the user may inadvertently touch text or an image with a hyperlink. The touch screen of the mobile terminal displays the webpage specified by the hyperlink rather than the next page that the user expects to read.

Further, the width and height of the webpage provided by the Internet is larger than the width and height of the screen of a mobile terminal (e.g., a mobile phone). When a user browses webpages on the mobile terminal, he/she needs to continuously zoom in and out, as well as move around the webpage. In this case, webpage reading can be very inconvenient.

BRIEF SUMMARY OF THE DISCLOSURE

The present disclosure is directed to solve one or more problems set forth above. One goal of the present disclosure is to provide a method for webpage reading based on mobile terminal. The webpage reading method can be used for pre-reading the next webpage contents before all current webpage contents are displayed and reading promptly the next webpage contents when the pre-set condition of displaying next webpage contents is satisfied (e.g., touching "Next Page" key), thereby reducing the time spent in waiting for reading the next webpage contents so as to improve the reading experience of a user. In addition, another goal of the present disclosure is to provide an apparatus for webpage reading based on mobile terminal and mobile terminal including the webpage reading apparatus.

One aspect of the present disclosure provides a method for webpage reading based on mobile terminal. The method includes: based on an input uniform resource locator (URL), loading current webpage contents corresponding to the URL from a webpage server and displaying the loaded webpage contents; detecting whether a pre-reading keyword is included in an obtained Hypertext Markup Language (HTML) file or document object model (DOM) corresponding to the URL when loading the current webpage contents; when the pre-reading keyword is included in the HTML file or DOM, determining whether a percentage of the contents displayed on a display screen of a mobile terminal with respect to entire current webpage contents reaches or exceeds a pre-set threshold value; when the percentage of the displayed contents with respect to the entire current webpage contents reaches or exceeds the pre-set threshold value, pre-reading and caching the next webpage contents based on a web address associated with the pre-reading keyword; and when a pre-set condition of displaying the next webpage contents is satisfied, displaying the cached next webpage contents.

In addition, in another embodiment, before loading and displaying the current webpage contents corresponding to the input URL, the method further includes, based on the input URL, determining whether the current webpage contents to be loaded are suitable for reading. Only when the webpage contents to be loaded are suitable for reading, the method starts to detect whether a pre-reading keyword is included.

In addition, preferably, the pre-set threshold value may be any value of 50%-90%. For example, the pre-set threshold value may be 50%, 60%, 70%, 80% or 90%.

When displaying the webpage contents on the mobile terminal, the method further includes rearranging automatically the webpage contents to be displayed based on parameters of the mobile terminal. In addition, when the webpage contents to be displayed are rearranged automatically, the method further includes labeling content having a hyperlink in the displayed webpage using an annotation symbol. When the content is displayed, if the content labeled by the annotation symbol is clicked, the URL corresponding to the hyperlink in the labeled content is displayed at the bottom of the display screen. Further, when the URL displayed at the bottom of the display screen is clicked, the contents corresponding to the URL are displayed in the current window or pop-up window.

In addition, in one embodiment, the pre-set condition of displaying the next webpage contents includes completing the display of the current webpage contents and clicking on the pre-reading keyword displayed at the bottom of the current webpage; or when the display screen of the mobile terminal is a touch screen, completing the display of the current webpage contents and making a page-turning motion; or operating a button on the mobile terminal for page-turning operations.

In one embodiment, displaying the cached next webpage contents refers to displaying all the contents of the next webpage, including a title, a display window and body content of the next page.

In another embodiment, displaying the cached next webpage contents refers to keeping the display window of the current webpage as well as updating the title and the body content of the current webpage by using the title and the body content of the next webpage.

Another aspect of the present disclosure provides an apparatus for webpage reading based on mobile terminal. The apparatus includes: a current page loading unit configured to load the current webpage contents corresponding to the URL from a webpage server based on an input URL; a pre-reading keyword detecting unit configured to detect whether a pre-reading keyword is included in an obtained HTML file or DOM corresponding to the URL when loading the current webpage contents; a content display determining unit configured to determine whether a percentage of the contents displayed on a display screen of a mobile terminal in the entire current webpage contents reaches or exceeds a pre-set threshold value when detecting that the pre-reading keyword is included in the HTML file and DOM; a pre-reading unit configured to pre-read the next webpage contents from a webpage server according to the URL corresponding to the pre-reading keyword when the percentage of the current contents displayed on a display screen of a mobile terminal in the entire current webpage reaches or exceeds the pre-set threshold value; a cache unit configured to cache the pre-reading next webpage contents; and a display unit configured to display the current webpage contents after loading the current webpage contents and display the cached next webpage contents when a pre-set condition of displaying next webpage contents is satisfied.

In another embodiment, the webpage reading apparatus may also include a webpage reading determining unit configured, based on an input URL, to determine whether the current webpage contents to be loaded are suitable for reading. In addition, only when the webpage reading determining unit determines that the webpage contents to be loaded are suitable for reading, the pre-reading keyword detecting unit starts to detect whether the pre-reading keyword is included.

In addition, in another embodiment, the webpage reading apparatus may also include a rearrangement unit configured to automatically rearrange the webpage contents to be displayed based on parameters of the mobile terminal before displaying the webpage contents on the mobile terminal. Preferably, the rearrangement unit may also include an annotation unit configured to label content having a hyperlink in the displayed webpage using an annotation symbol. Only when the content labeled by the annotation symbol is clicked, the display unit displays the URL corresponding to the hyperlink in the labeled content at the bottom of the display screen.

Another aspect of the present disclosure provides a method for webpage reading based on mobile terminal. The method includes: loading the current webpage contents corresponding to the URL from a webpage server based on an input URL; performing repeatedly the following operations until a pre-reading keyword is not detected in an HTML file or DOM corresponding to the last webpage URL of the displayed webpage contents: displaying the loaded or spliced webpage contents; detecting whether the pre-reading keyword is included in the HTML file or DOM corresponding to the last webpage URL of the displayed webpage contents; when the pre-reading keyword is included in the HTML file or DOM, determining whether a percentage of displayed content of the last webpage of the webpage contents to be displayed with respect to the entire current webpage contents of the last webpage reaches or exceeds a pre-set threshold value; when the percentage of displayed contents with respect to the entire webpage contents reaches or exceeds a pre-set threshold value, pre-reading the contents of the next webpage of the displayed last webpage based on a web address associated with the pre-reading keyword; and splicing the pre-reading next webpage contents and the currently displayed last webpage.

In addition, in one or more examples in the above embodiments, splicing the pre-reading next webpage contents and the currently displayed last webpage may also include: filtering a pre-reading keyword in the currently displayed last webpage and the webpage contents below the pre-reading keyword.

In addition, in one or more examples in the above embodiments, splicing the pre-reading next webpage contents and the currently displayed last webpage may also include: setting a separation pattern between the pre-reading next webpage contents and the currently displayed last webpage.

Another aspect of the present disclosure provides an apparatus for webpage reading. The apparatus includes: a current webpage content loading unit configured to load the current webpage contents corresponding to the URL from a webpage server based on an input URL; a display unit configured to display the loaded or spliced webpage contents; a pre-reading keyword detecting unit configured to detect whether a pre-reading keyword is included in an HTML file or DOM corresponding to the last webpage URL of the displayed webpage contents; a content display determining unit configured to determine whether a percentage of displayed contents of the last webpage of the webpage contents to be displayed in the entire current webpage contents of the last webpage reaches or exceeds a pre-set threshold value when the pre-reading keyword is included in the HTML file or DOM; a pre-reading unit configured to pre-read the contents of the next webpage of the displayed last webpage based on a web address associated with the pre-reading keyword when the percentage of displayed contents with respect to the entire webpage contents reaches or exceeds a pre-set threshold value; and a splicing unit configured to splice the pre-reading next webpage contents and the currently displayed last webpage. The pre-reading keyword detecting unit detects repeatedly the displayed webpage contents until the pre-reading keyword is not detected.

In addition, in one or more examples in the above embodiments, the splicing unit may also include a filtering module configured to filter a pre-reading keyword in the currently displayed last webpage and the webpage contents below the pre-reading keyword.

In addition, in one or more examples in the above embodiments, the splicing unit may also include a setting module configured to set a separation pattern between the pre-reading next webpage contents and the currently displayed last webpage.

Another aspect of the present disclosure provides a mobile terminal, including the above described apparatus for webpage reading.

In order to achieve the above and other related objectives, one or more aspects of the present invention include those features to be described in detail in the followings and particularly pointed out in the claims. The following descriptions and accompanying drawings describe in detail certain illustrative aspects of the present invention. However, these aspects only illustrate some of the ways in which the principle of the present invention can be used. In addition, the present invention intends to include all these aspects and their equivalents.

Beneficial Effects

The webpage reading method based on mobile terminal can be used for pre-reading the next webpage contents before all current webpage contents are displayed and displaying promptly the next webpage contents after the user finishes reading the current webpage contents, thereby reducing the time spent in waiting for reading the next webpage contents so as to improve the reading experience of a user.

In addition, when the next webpage contents are displayed, the display window of the current webpage may be kept, only the title and body content of the next webpage replace the title and body content of the current webpage separately, thus avoiding flicker problem of displaying the next webpage on the display screen, as well as implementing faster update so as to make readers feel more smoothly.

BRIEF DESCRIPTION OF THE DRAWINGS

By referring to the descriptions of the accompanying drawings, and with a full understanding of the present invention, the above and other purposes, characteristics, and advantages of the present invention will be more clearly and easily understood. In the drawings:

FIG. 2 illustrates a schematic diagram of an exemplary display screen of a mobile terminal when content of a hyperlink is clicked consistent with the disclosed embodiments;

FIG. 10 illustrates a schematic diagram of an exemplary filtering process for reading webpage;

FIGS. 11A and 11B illustrate a schematic diagram of an exemplary display screen before a webpage is spliced and after a webpage is spliced, respectively;

FIGS. 12A and 12B illustrate a schematic diagram of another exemplary display screen before a webpage is spliced and after a webpage is spliced, respectively; and FIG. 13 illustrates a block diagram of an exemplary mobile terminal with a webpage reading apparatus consistent with the disclosed embodiments.

The same label may be used in all drawings to indicate similar or corresponding feature or function.

DETAILED DESCRIPTION

In the following description, for purposes of illustration, many specific details are illustrated in order to provide a full understanding of one or more embodiments. However, obviously, those embodiments can also be implemented in the case of these specific details are changed, replaced, or alternated.

The followings, together with accompanying drawings, describe in detail certain embodiments of the present invention.

Embodiment One

Figure 1:
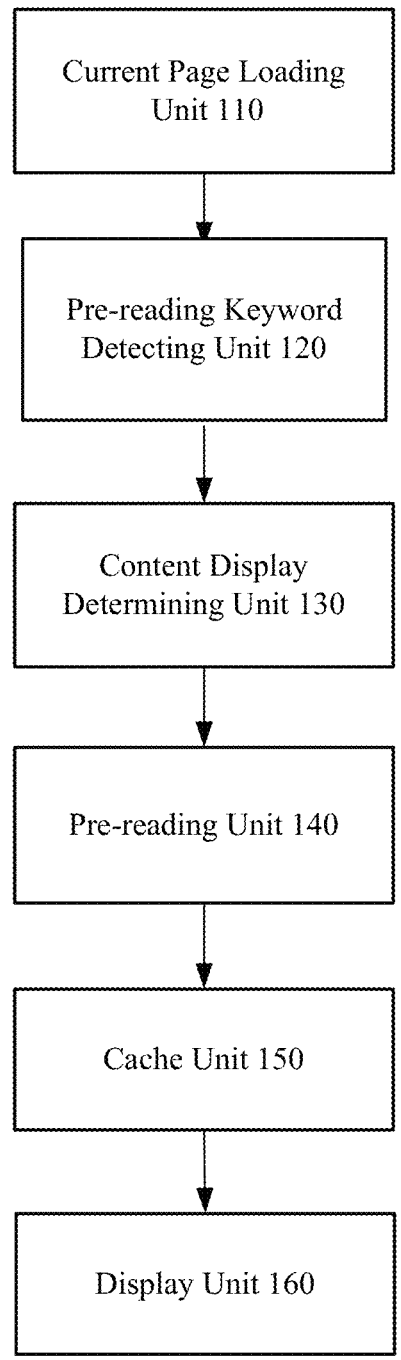
FIG. 1 illustrates a block diagram of an exemplary webpage reading apparatus according to embodiment one of the present invention.

FIG. 1 illustrates a block diagram of an exemplary webpage reading apparatus 100 according to embodiment one of the present invention. As shown in FIG. 1, the webpage reading apparatus 100 includes a current page loading unit 110, a pre-reading keyword detecting unit 120, a content display determining unit 130, a pre-reading unit 140, a cache unit 150 and a display unit 160.

The current page loading unit 110 is configured, based on a uniform resource locator (URL) (web address) inputted by a user, to load the current webpage contents corresponding to the URL from a web server (e.g., a web server from Sina website). For example, the current page loading unit 110 reads a serial novel's webpage contents from the Sina website's web server. The current webpage contents loaded by the current page loading unit 110 are displayed on the display unit 160.

The pre-reading keyword detecting unit 120 is configured to detect whether pre-reading keywords are included in an Hypertext Markup Language (HTML) file or document object model (DOM) corresponding to a URL when the current page loading unit 110 is loading the current webpage content. The pre-reading keyword is link text or symbol content that is contained in the currently displayed page and can direct to the next page. Webpages rendered on the Internet are set by the HTML file. The webpage for reading and browsing on the Internet is constituted by the display window title and contents. The title and the body of the webpage can be determined based on the HTML file of the webpage. When the body includes too much contents, the body is divided into several pages. Further, the HTML which describes the webpage can include words or symbols of navigation links that direct to the next page. Such words are called pre-reading keywords or keywords here.

When the current page loading unit 110 loads the current webpage contents based on an input URL, the current page loading unit 110 can obtain an HTML file which corresponds to the URL. When detecting pre-reading keywords, the pre-reading keyword detecting unit 120 may detect whether pre-reading keywords directing to the link of the next page are included in the obtained HTML file.

The pre-reading keywords directing to the link of the next page may include "Next Page", "[Next Page]", "The Next Page", "[The Next Page]", "Next Page|", ">> Next Page", ">> Next Page|", "The Next Sheet", "[The Next Sheet]", "[→]", ">", "[>]", "[→>]", ">>", "[>>]", "Next Chapter", "[Next Chapter]", "The Next Chapter", "[The Next Chapter]", "Next Section", "[Next Section], etc. The pre-reading keywords mentioned above may also be given different priorities. Based on statistical analysis of the pre-reading keywords in a large number of webpages, priorities of the above pre-reading keywords are listed in a descending order, from left to right.

A webpage may contain more than one pre-reading keyword, i.e., the webpage contains more than one navigation link. For example, the same web page may contain both the "Next Page" and "Next Chapter". In this case, based on the priority of each detected pre-reading keyword, the pre-reading keyword with the highest priority is selected. Further, a pre-reading process is performed based on the URL corresponding to the selected pre-reading keyword.

In addition, when the current page loading unit 110 loads the webpage contents based on an input URL, a DOM is generated. The DOM indicates a path that reaches the webpage contents (i.e. a web content link) The title of the web contents can be found by using the path of the DOM tree/HTML/BODY/DIV/DIV[4]/DIV/DIV/H1. Based on //*[@ id=" contTxt" in the DOM tree, the web contents may be obtained. Further, if there is a next page, DOM tree can also include a next page link, e.g., //[_AT_id="next_link]. The next page link is a pre-reading keyword that links to the next webpage contents based on the //[@_id="next_link"]. Therefore, the existence of the pre-reading keyword can be judged by detecting whether the link of the specified next page//*[_AT_ ID="next_link] exists in the DOM tree.

If the pre-reading keywords are included in the HTML file or DOM that describes the current webpage, the content display determining unit 130 determines whether a percentage of the current contents displayed on the display screen of the mobile terminal in the entire current webpage reaches or exceeds a pre-set threshold value. Preferably, the pre-set threshold value may be 50%, 60%, 70%, 80% or 90%.

When the content display determining unit 130 determines that the percentage of the current contents displayed on the display screen in the entire current webpage contents M % reaches or exceeds the pre-set threshold value, based on the detected pre-reading keyword, the pre-reading unit 140 pre-reads the next webpage contents from a webpage server according to the URL corresponding to the pre-reading keyword. Then the cache unit 150 stores the pre-reading next webpage contents.

The display unit 160 is configured to display the current webpage contents after the current page loading unit 110 loads the current webpage contents. In addition, when a pre-set condition of displaying next webpage contents is satisfied, the display unit 160 displays the cached next webpage contents. It should be noted that, the pre-set condition of displaying the next webpage contents includes completing the display of the current webpage contents and clicking on the pre-reading keyword displayed at the bottom of the current webpage; or completing the display of the current webpage contents and making a page-turning motion when the display screen of the mobile terminal is a touch screen, or operating a button on the mobile terminal for page-turning operations. That is, the display unit 160 can display the cached next webpage contents through the following ways: clicking on the pre-reading keyword displayed at the bottom of the current webpage to display the pre-read next webpage contents when the pre-reading keyword is displayed as the next page button on the screen; making a page-turning motion by a finger (or a touch pen, etc.) touching the touch screen to display the pre-read next webpage contents when using a touch screen; pressing the next page button on the terminal to display the pre-read next webpage contents.

When the next webpage is displayed, the current webpage contents can be cleared immediately and the next webpage contents are displayed. For example, when the next page button on the terminal is pressed or the pre-reading keyword displayed at the bottom of the current webpage is clicked, the currently displayed webpage is replaced by the pre-read next webpage immediately.

In one or more alternative examples, the webpage reading apparatus may also include a webpage reading determining unit (not illustrated in FIG. 1). The webpage reading determining unit is configured, based on an input URL, to determine whether the webpage contents to be loaded are suitable for reading. In addition, only when the webpage reading determining unit determines that the webpage contents to be loaded are suitable for reading, the pre-reading keyword detecting unit 120 starts to detect whether pre-reading keywords are included in an HTML file or DOM corresponding to the URL.

It should be noted that the contents of a certain webpage displayed on the Internet may be the contents that are suitable for reading by using the webpage reading method of the present invention, for example, a serial novel's contents or a series of photos; it may also be the contents that are not suitable for reading by using the webpage reading method of the present invention, for example, a news webpage of a web portal.

Figure 6:
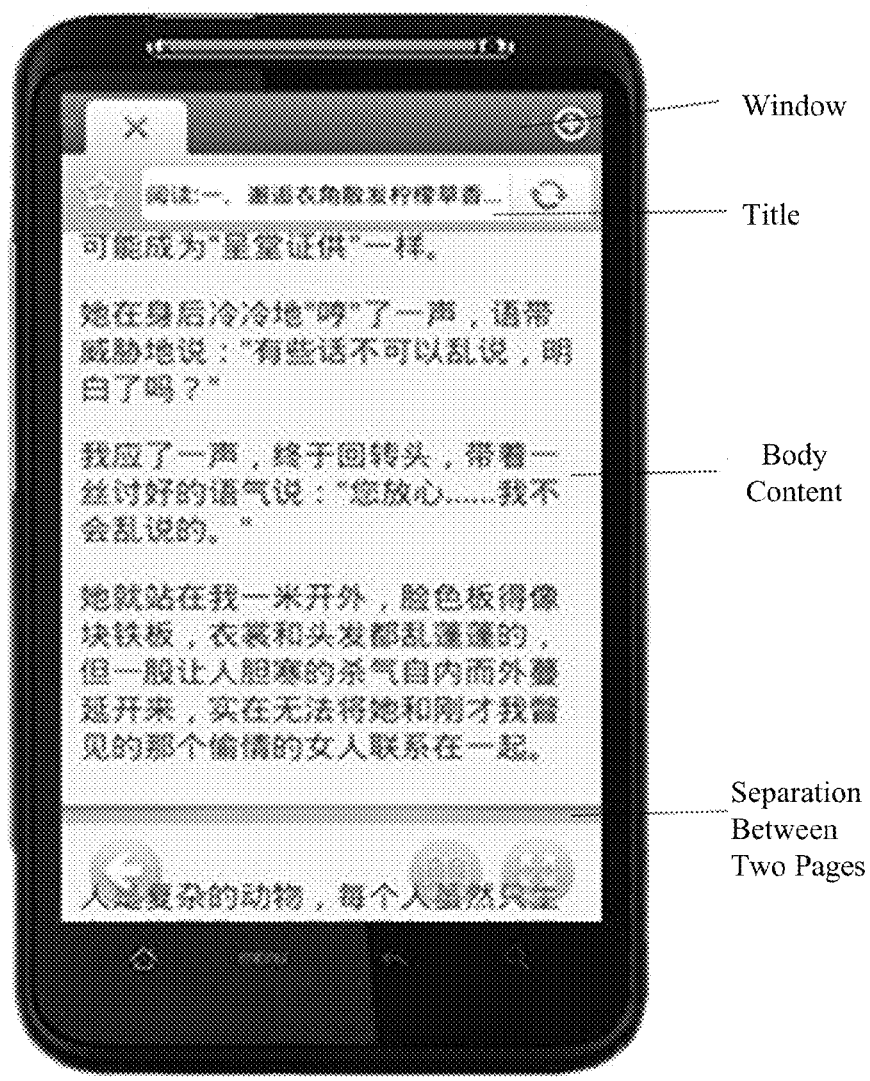
FIG. 6 illustrates an exemplary text display on a mobile phone screen in reading mode.

After loading a webpage, the webpage reading determining unit determines whether the webpage is suitable for reading by using the webpage reading method of the present invention based on a webpage's uniform resource locator (URL). For example, the following is a URL of a serial novel of the reading channel in Sina website: http://vip.book.sina.com.cn/book/chapter_78518_50398.html The extension "HTML" is located at the end of the URL, and two numbers with the prefix "_" are located consecutively before the extension. That is, the model of the end of the URL can be summarized as: _\\d+_\\d+.html, where "\\d" represents a single digit, "\\d+" represents more than one digit. Thus, when the end of the URL has the model "_\\d+_\\d+.html", the contents of the URL are determined as readable contents such as a serial novel. Therefore, the contents of the URL are suitable for reading by using the webpage reading method of the present invention. Moreover, after determining the contents of the current page are suitable for reading, the current page may be displayed by reading mode, which displays only the text part of the webpage, as shown in FIG. 6.

In addition, in one or more alternative examples, according to the present embodiment, the webpage reading apparatus 100 may also include a rearrangement unit (not shown in FIG. 1). After loading the webpage contents on a mobile terminal, and before displaying the webpage contents on the mobile terminal, the rearrangement unit automatically rearranges the webpage contents to be displayed based on parameters of the mobile terminal. For example, based on the width, height and resolution of the display screen of a mobile terminal, the rearrangement unit rearranges the webpage contents to be displayed, making the rearranged webpage suitable for the width of the display screen of the mobile terminal. In addition, the rearrangement unit may also include an annotation unit (not shown in FIG. 1). The annotation unit is configured to label content having a hyperlink in the displayed webpage using an annotation symbol. Only when the content labeled by the annotation symbol is clicked, the display unit 160 displays the URL corresponding to the hyperlink in the labeled content at the bottom of the display screen.

FIG. 2 illustrates a schematic diagram of an exemplary display screen of a mobile terminal when content of a hyperlink is clicked. As shown in FIG. 2, text content containing a hyperlink "mail" is displayed on the display screen of a mobile terminal. The hyperlink "mail" is linked to http://xxxx.com/mail.html and is labeled with a superscript [1]. When a reader clicks on "mail" (for example, touching by using a finger), the display screen does not display or pop-up a new window to display the URL linked to "mail". Instead, the hyperlink annotation symbol [1] is displayed at the bottom of the display screen and the URL specified by the hyperlink is displayed. If a reader is interested in the hyperlink, the user can click the URL displayed at the bottom of the display screen to browse the webpage.

Figure 3:
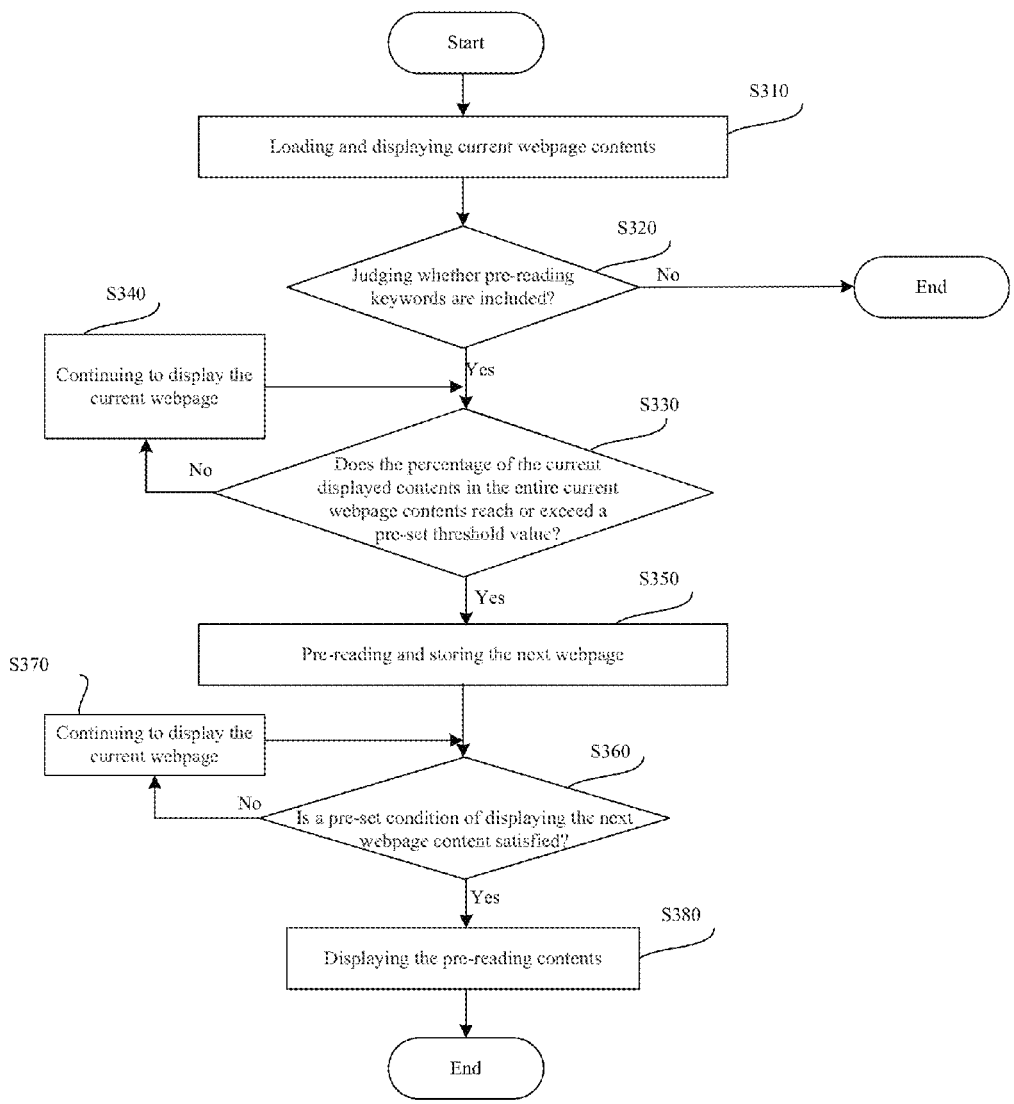
FIG. 3 illustrates a flow chart of an exemplary method that a webpage reading apparatus implements webpage reading on a mobile terminal according to embodiment one of the present invention.
Figure 4:
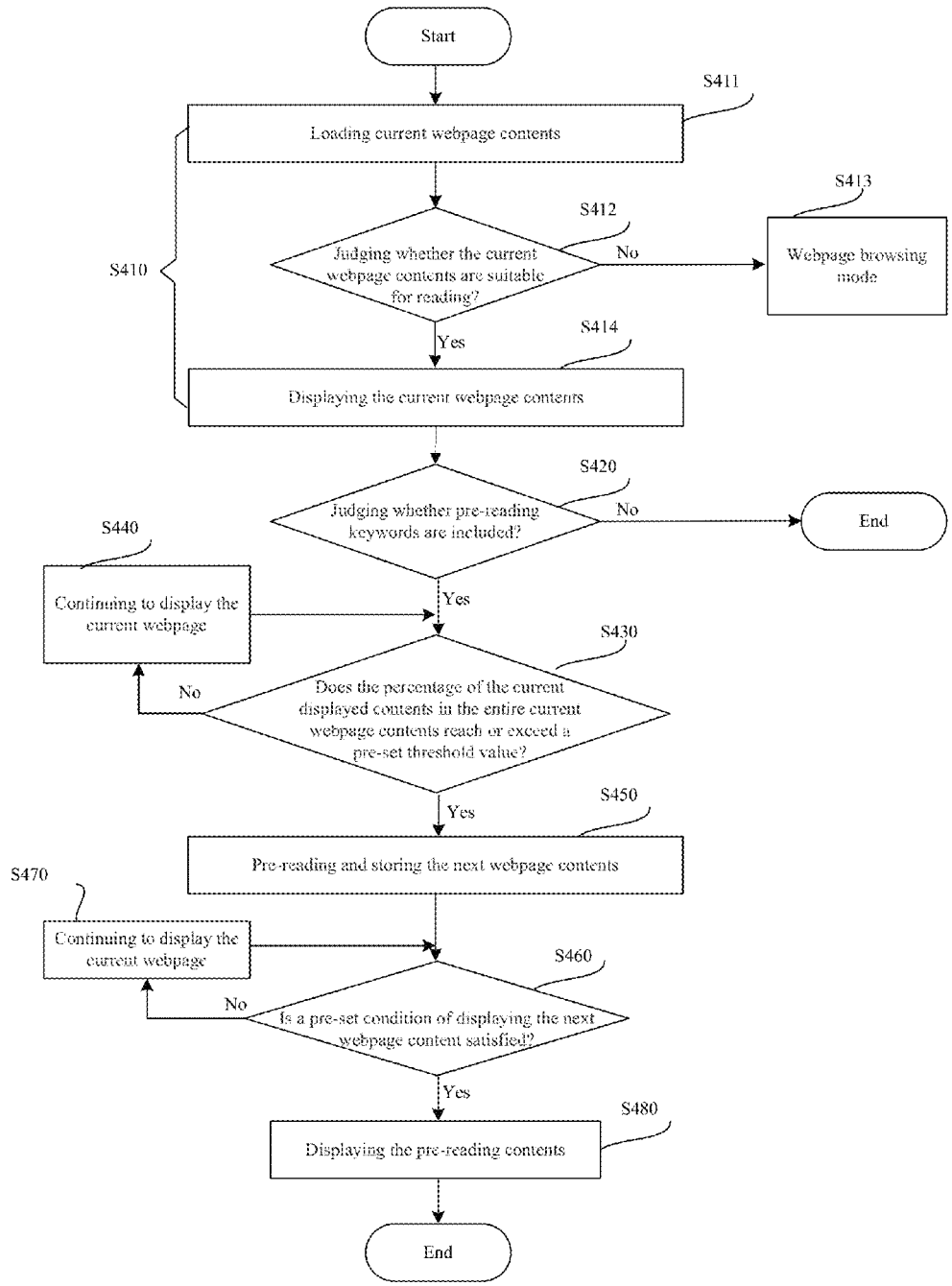
FIG. 4 illustrates a flow chart of an exemplary modified method that a webpage reading apparatus implements webpage reading on a mobile terminal according to embodiment one of the present invention.

FIG. 1 and FIG. 2 describe a webpage reading apparatus in a mobile terminal according to the embodiments of the present invention. FIG. 3 and FIG. 4 describe a webpage reading method for reading webpages in a mobile terminal in detail according to the embodiments of the present invention.

FIG. 3 illustrates a flow chart of an exemplary method that a webpage reading apparatus implements webpage reading on a mobile terminal consistent with the disclosed embodiments. As shown in FIG. 3, when a reader reads a webpage on the Internet using a mobile terminal (e.g., a mobile phone), at the beginning, in S310, after inputting a URL of a webpage to be read, the current page loading unit 110 loads the webpage contents corresponding to the URL from a webpage server and displays the webpage contents on the display unit 160. Those skilled in the art would well know that the webpage contents displayed on the display unit 160 includes a display window, title displayed on the display window and body content (shown in FIG. 5). In an alternative embodiment, before the webpage contents are displayed on the display unit 160, the webpage contents to be displayed are rearranged automatically based on the parameters of a mobile terminal. For example, based on the width, height and resolution of the display screen of a mobile terminal, the webpage contents to be displayed may be rearranged, making the rearranged webpage suitable for the width of the display screen of the mobile terminal. In addition, when a webpage is rearranged, the content having a hyperlink in the displayed webpage may be labeled using an annotation symbol. Only when the content labeled by the annotation symbol is clicked, the display unit displays the URL corresponding to the hyperlink in the labeled content at the bottom of the display screen.

Then, the pre-reading keyword detecting unit detects whether pre-reading keywords are included in the obtained HTML file or DOM corresponding to the URL. When the pre-reading keyword detecting unit detects that the pre-reading keywords are included in the obtained HTML file or DOM corresponding to the URL, the content display determining unit determines whether the percentage of the current contents displayed on the display screen of the mobile terminal in the entire current webpage reaches or exceeds a pre-set threshold value.

Specifically, after the current webpage contents are loaded, in S320, the pre-reading keyword detecting unit 120 detects whether pre-reading keywords are included in the obtained HTML file or DOM corresponding to the URL. For example, the pre-reading keyword detecting unit 120 detects whether the pre-reading keywords are included in the HTML file that describes the displayed webpage. Or the pre-reading keyword detecting unit 120 detects whether pre-reading keywords exists in the generated DOM. In the above examples, the next page link is obtained by using the pre-reading keyword//[@_id="next_link"] that links to the specified next page.

If the pre-reading keyword detecting unit 120 detects that at least one pre-reading keyword is included in the HTML file or DOM, the process goes to S330; otherwise, the process is ended. In S330, the content display determining unit 130 determines whether the percentage M % of the current webpage contents displayed on the display screen of the mobile terminal in the entire current webpage contents reaches or exceeds a pre-set threshold value. Preferably, the pre-set threshold value may be 50%, 60%, 70%, 80% or 90%.

When the content display determining unit 130 determines that the percentage of the current webpage contents displayed on the display screen in the entire current webpage reaches or exceeds the pre-set threshold value, in S350, based on the detected pre-reading keyword, the pre-reading unit 140 pre-reads the next webpage contents from a webpage server based on the URL corresponding to the pre-reading keyword. Then the cache unit 150 stores the pre-reading next webpage contents (S350). When the pre-reading keyword detecting unit 120 detects that a webpage contains more than one pre-reading keyword, the pre-reading unit 140 pre-reads the webpage contents of the URL corresponding to the pre-reading keyword with the highest priority.

When the content display determining unit 130 determines that the percentage of the current webpage contents displayed on the display screen in the entire current webpage does not reach the pre-set threshold value, the process goes to S340. In S340, the current webpage contents continue to be displayed.

After the pre-reading unit 140 pre-reads and caches the next webpage contents, the process goes to S360. In S360, the webpage reading apparatus determines whether a pre-set condition of displaying the next webpage contents is satisfied. The pre-set condition of displaying the next webpage contents includes clicking on a key that is used to display the pre-reading keyword set on the screen; or operating a button on the mobile terminal for page-turning operations; or performing a page-turning operation when the display screen of the mobile terminal is a touch screen. When the pre-set condition of displaying the next webpage contents is not satisfied, in S370, the process continues to display the current webpage contents.

When the pre-set condition of displaying the next webpage contents is satisfied, the process goes to S380. In S380, the pre-reading next webpage contents stored in the cache unit 150 is read and displayed on the display unit 160. It should be noted that, according to one embodiment of the present invention, when the cached next webpage contents are displayed on the display unit 160, all the contents included in the current webpage displayed in the display unit 160 are updated by the cached next webpage contents. That is, the title, the window and the body content of the current webpage displayed in the display unit 160 are updated. In other words, the window is re-drawn on the display screen of the mobile terminal; the title of the next webpage contents is displayed in the upper part of the display window, as well as the body content of the next webpage is displayed in the display window. However, in this case, because the display window is re-drawn on the display screen, the process for displaying the next webpage contents takes longer time, causing flicker problem of the display screen.

Accordingly, in a very long readable content (such as a serial novel), the display windows of various pages are the same, only the title on the upper part of the display window and body content in the display window of each page are different. Therefore, when the cached next webpage contents are displayed on the display unit 160, the display window of the current webpage may keep unchanged. The title on the upper part of the display window is updated to the title of the cached next webpage content. The body content in the display window is updated to the body content of the next webpage content.

FIG. 4 illustrates a flow chart of an exemplary modified method that a webpage reading apparatus implements webpage reading on a mobile terminal consistent with the disclosed embodiments. The difference between FIG. 4 and FIG. 3 is that, after the current page loading unit 110 loads the current webpage contents, and before the display unit 160 displays the webpage contents, the webpage reading apparatus needs to determine whether the current webpage contents are suitable for reading. Specifically, S310 in FIG. 3 is replaced by S411, S412, S413 and S414 in FIG. 4. S420 to S480 in FIG. 4 are the same as S320 to S380 in FIG. 3. Only S411, S412, S413 and S414 in FIG. 4 are described in detail, omitting the descriptions of the remaining steps in FIG. 4.

As shown in FIG. 4, at the beginning, in S411, after inputting a URL of a webpage to be read, the current page loading unit 110 loads the webpage contents corresponding to the URL from a webpage server. Then, in S412, the webpage reading determining unit determines whether the current webpage contents are suitable for reading. If the current webpage contents are suitable for reading, in S414, the display unit 160 displays the current webpage contents. If the current webpage contents are not suitable for reading, in S413, the webpage reading apparatus browses webpages by webpage browsing mode and ends the process.

Further, as shown in FIG. 4, the sequence of S414 and S420 can also be interchanged. In other words, S420 can be performed first, and then S414 is performed.

The disclosed reading method based on the mobile terminal can be used for pre-reading the next webpage contents before all current webpage contents are displayed and displaying promptly the next webpage contents after reading the current webpage contents, thereby reducing the time spent in waiting for reading the next webpage contents so as to improve the reading experience of a user.

In addition, when the next webpage contents are displayed, the display window of the current webpage may be kept, only the title and body content of the current webpage are replaced by the title and body content of the following webpage, thus avoiding flicker problem of displaying the next webpage on the display screen, as well as implementing faster update so as to make readers feel more smoothly.

Embodiment Two

Figure 5:
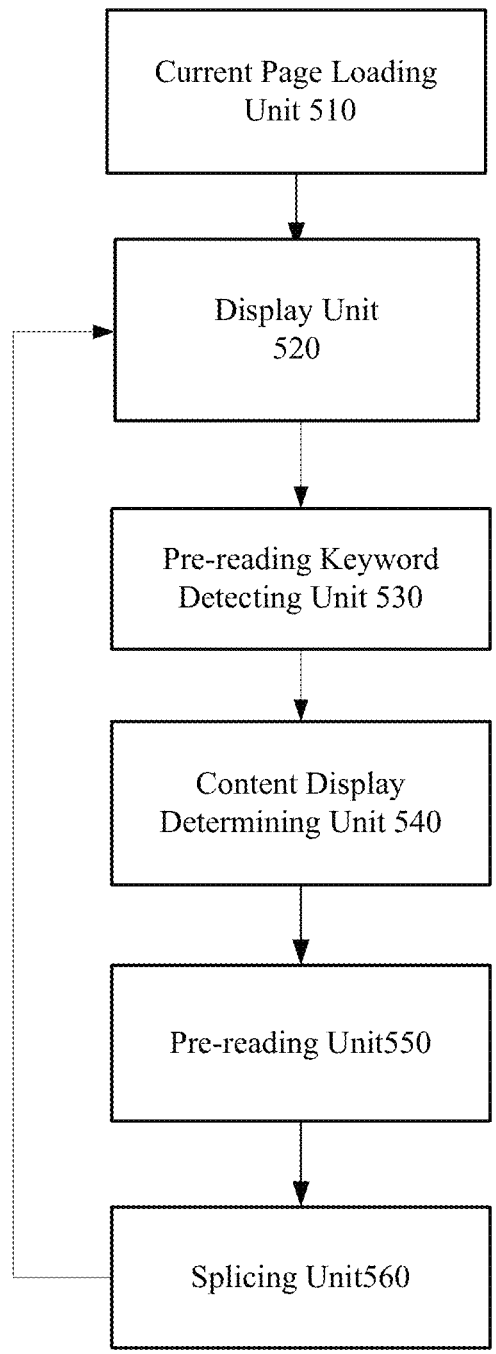
FIG. 5 illustrates a block diagram of an exemplary webpage reading apparatus according to embodiment two of the present invention.

FIG. 5 illustrates a block diagram of another exemplary webpage reading apparatus 200 consistent with the disclosed embodiments. As shown in FIG. 5, the webpage reading apparatus 200 includes a current webpage loading unit 510, a display unit 520, a pre-reading keyword detecting unit 530, a content display determining unit 540, a pre-reading unit 550 and a splicing unit 560.

The webpage reading apparatus 200 is similar to the webpage reading apparatus 100 in FIG. 1. The current page loading unit 510 is configured, based on a URL inputted by a user, to load the current webpage contents corresponding to the URL from a web server (e.g., a web server from Sina website). For example, the current page loading unit 510 reads a serial novel's webpage contents from the Sina website's web server. The current webpage contents loaded by the current page loading unit 510 are displayed on the display unit 520. In addition, the display unit 520 may also be configured to display the obtained webpage content after splicing process is performed.

The pre-reading keyword detecting unit 530 is configured to detect whether pre-reading keywords are included in an HTML file or DOM corresponding to the last webpage URL of the displayed webpage contents. As used herein, when the displayed webpage contents are the current webpage contents loaded from the webpage server, the last webpage of the displayed webpage contents is the current webpage. When the displayed webpage contents are the obtained webpage contents after splicing process is performed, the last webpage of the displayed webpage contents is a recently pre-read webpage.

When loading or pre-reading the webpage contents based on the inputted URL, an HTML file corresponding to the URL may be obtained. When detecting the pre-reading key words, the pre-reading key word detecting unit can detect whether the pre-reading key words directing to the link of the next page are included in the obtained HTML file. The pre-reading keywords directing to the link of the next page may include "Next Page", "[Next Page]", "The Next Page", "[The Next Page]", "Next Page|", ">> Next Page", ">> Next Page|", "The Next Sheet", "[The Next Sheet]", "[→]", ">", "[>]", "[→>]",">>", "[>>]", "Next Chapter", "[Next Chapter]", "The Next Chapter", "[The Next Chapter]", "Next Section", "[Next Section], etc. The pre-reading keywords may also be given different priorities. Based on statistical analysis of the pre-reading keywords in a large number of webpages, priorities of the above pre-reading keywords are listed in a descending order, from left to right.

A webpage may contain more than one pre-reading keyword, i.e., the webpage contains more than one navigation link. For example, the same web page may contain "Next Page" and "Next Chapter". In this case, based on the priority of each detected pre-reading keyword, the pre-reading keyword with the highest priority is selected. Further, a pre-reading process is performed based on the URL corresponding to the selected pre-reading keyword.

In addition, when the webpage contents based on an input URL are loaded or pre-read, a DOM is generated. The DOM indicates a path that reaches the webpage contents (i.e. a web content link) The title of the web contents can be found by using the path of the DOM tree/HTML/BODY/DIV/DIV[4]/DIV/DIV/H1. Based on//*[@_id=" contTxt" in the DOM tree, the web contents may be obtained. Further, if there is a next page, DOM tree can also include a next page link, e.g., //[_AT_id="next_link]. The next page link is a pre-reading key word, and can link to the next webpage contents based on the //[@_id="next_link"]. Therefore, the existence of the pre-reading keyword is judged by detecting where the link of the specified next page//*[_AT_ID="next_link] exists in the DOM tree.

If the pre-reading keyword detecting unit 530 detects that the pre-reading keywords are included in the HTML file or DOM, the content display determining unit 540 determines whether the percentage of displayed contents of the last webpage of the webpage contents displayed on the display screen of the mobile terminal in the entire current webpage contents of the last webpage reaches or exceeds a pre-set threshold value. Preferably, the pre-set threshold value may be 50%, 60%, 70%, 80% or 90%.

When the content display determining unit 540 determines that the percentage of the current contents displayed on the display screen in the entire current webpage M % reaches or exceeds the pre-set threshold value, based on the detected pre-reading keyword, the pre-reading unit 550 pre-reads the next webpage contents of the currently displayed last webpage from a webpage server according to the URL corresponding to the pre-reading keyword.

After pre-reading the next webpage contents, the splice unit 560 splices the pre-read next webpage contents with the currently displayed last webpage together. That is, the pre-read next webpage is spliced after the web page currently displayed last webpage. Thus, when the lowermost portion of the currently displayed last webpage is displayed, if the user continues to move up the page, for example, for a touch screen, when the user uses a finger to touch the touch screen and moves up the webpage, the next webpage is gradually displayed. In this case, the currently displayed webpage is not cleared immediately. The currently displayed webpage is gradually moved upward out from the screen with the finger's upward movement. At the same time, the next webpage is gradually moved into the display screen. FIG. 6 illustrates a schematic diagram of an exemplary text display on a mobile phone screen in reading mode. As shown in FIG. 6, on a display screen, two adjacent webpages are separated by a separation pattern (e.g., gray pattern in FIG. 6). The following is described in detail with specific examples for implementing the splicing process.

After the completion of the splicing process, the spliced web contents are continually displayed on the display unit 520. Then, the operations of the pre-reading keyword detecting unit 530, the content display determining unit 540, the pre-reading unit 550, and the splicing unit 560 are repeatedly performed until the pre-reading keyword detecting unit 530 detects that there is no pre-reading keyword in the webpage.

Figure 7A:
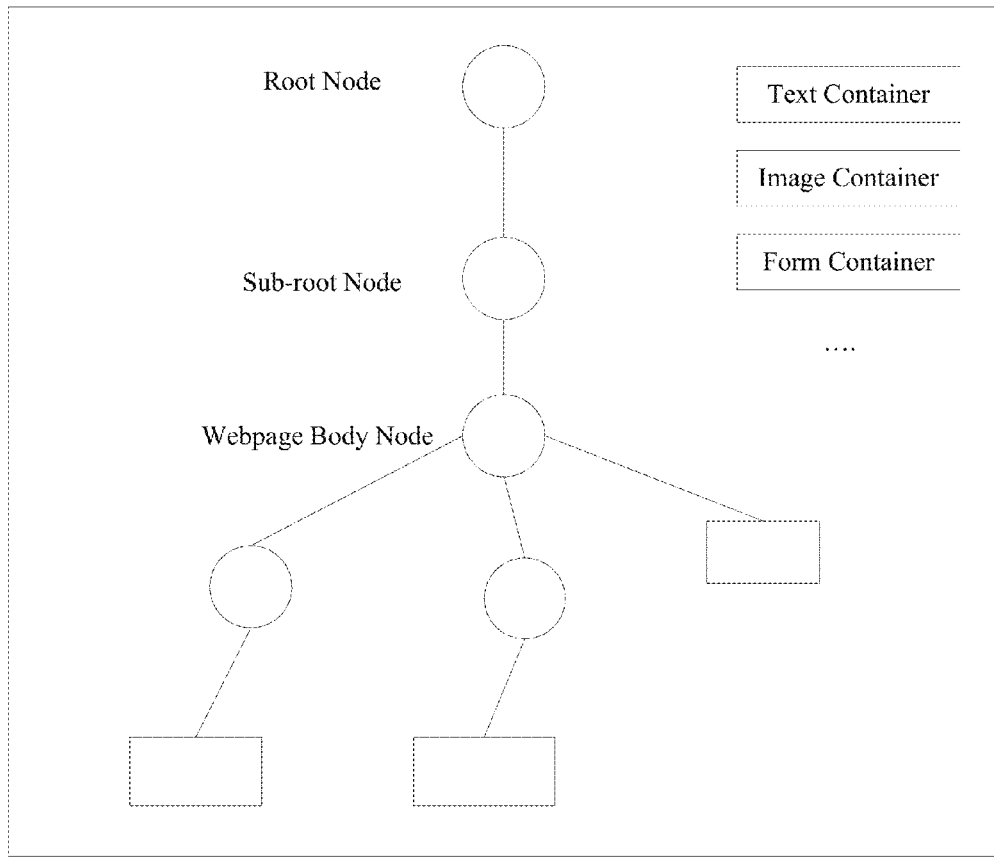
FIGS. 7A to 7F illustrate a schematic diagram of an exemplary splicing process.

The splicing process is described in detail according to FIGS. 7A to 7F. The splicing way refers to splicing webpage tree structures. FIG. 7A shows a tree-based webpage data structure. For all webpages, the browser adds two additional nodes: one root node and one sub-root node. The nodes beneath the sub-root node are real webpage nodes (In general, these nodes are body nodes). Each page has a set of related containers to store page data, such as text, images, forms, etc. For a picture element in the tree structure, it stores an index which points to a picture in the picture container.

Figure 7B:
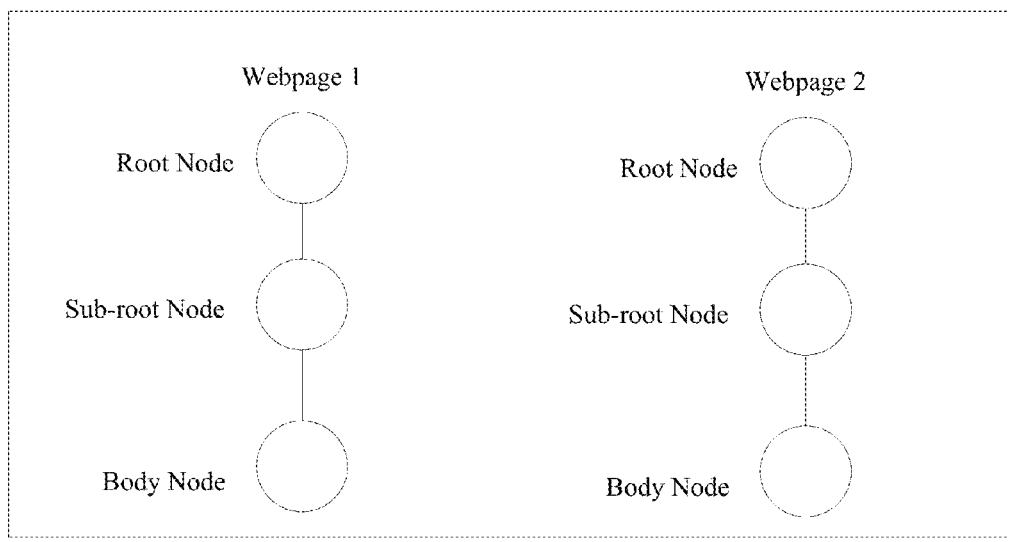
Figure 7C:
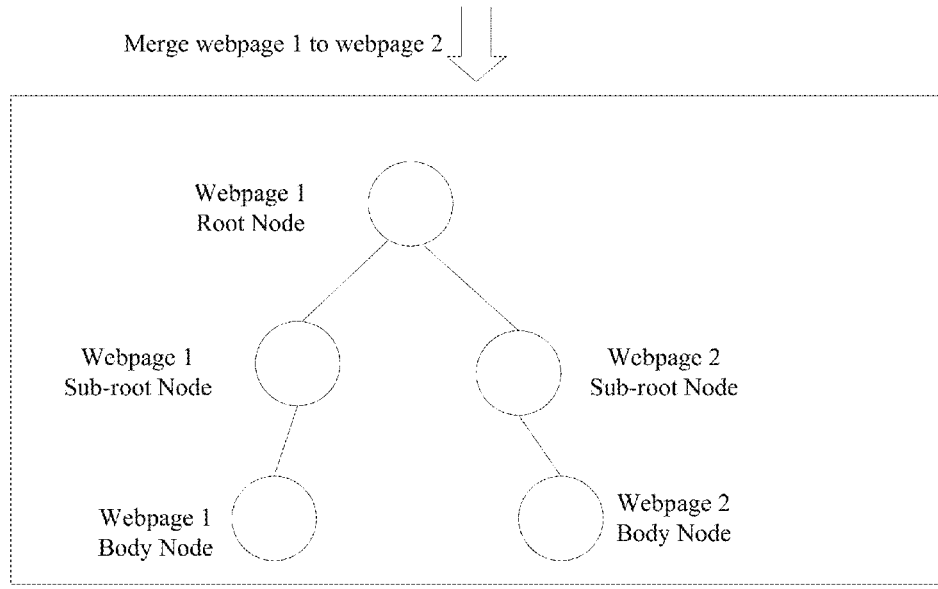

When the webpages are spliced, merge operations are performed on the tree structures and container structures, respectively. The merger of the tree structures is implemented through the root node and the sub-root node. FIG. 7B shows the tree structures of webpage 1 and webpage 2 before splicing the webpages. FIG. 7C shows a tree structure after splicing the webpages.

Figure 7D:
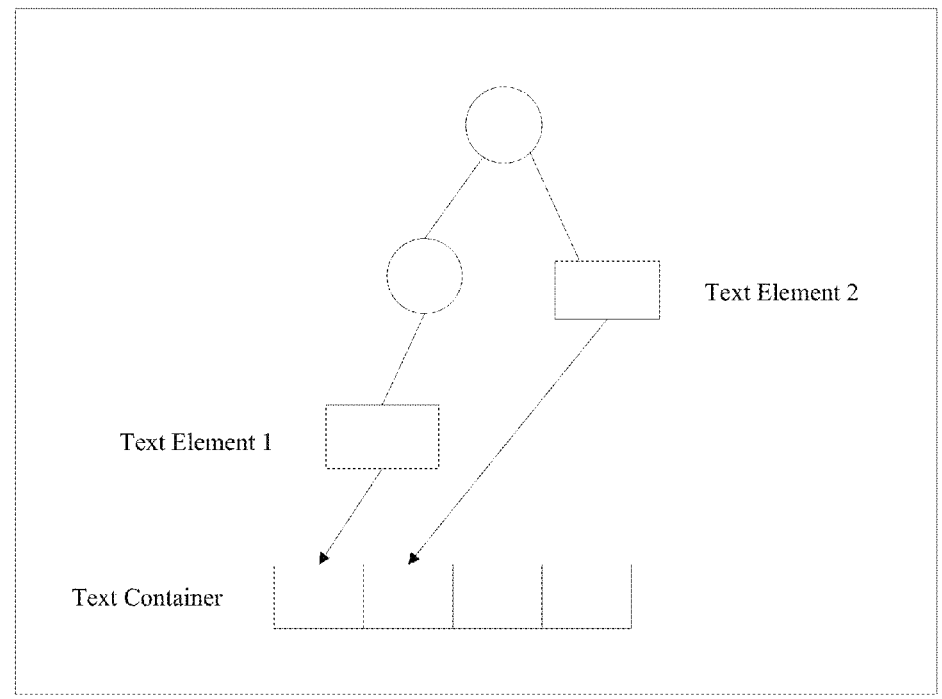

After the merger of the tree structures, the container structures are merged. After a page is loaded, indexes of the containers are stored in the elements. If a page B is merged with a page A and the same set of containers is used, as shown in FIG. 7D, in this case, resource indexes stored in all the elements of page B need to be reassigned and direct merger and separation of the containers are not very convenient.

Figure 7E:
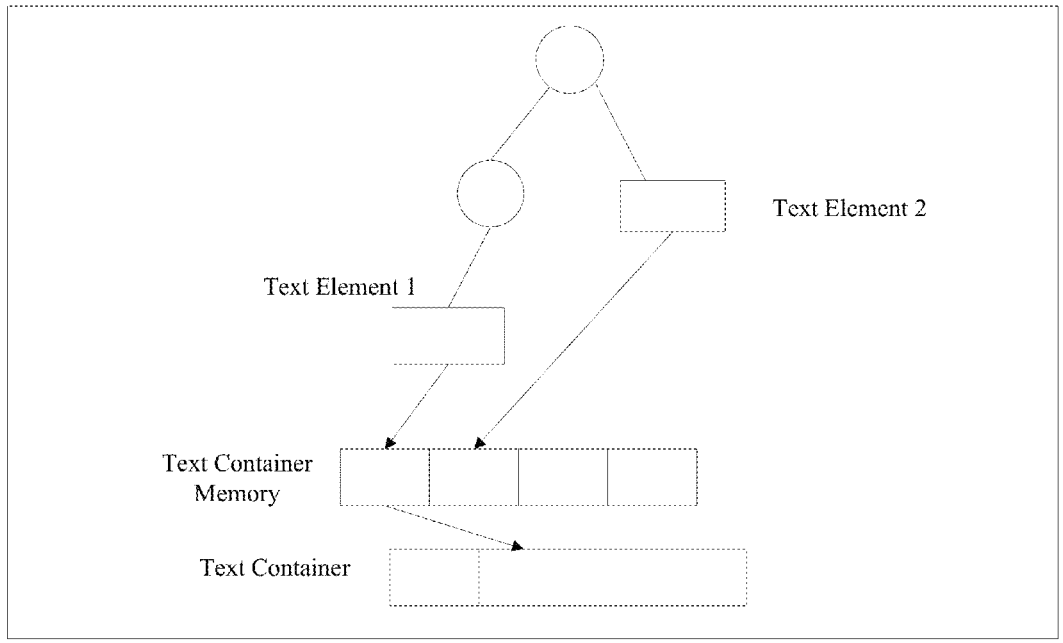

Accordingly, in order to solve the above-described problem, when the container structures are merged, the merger and separation of the container structures are implemented by adding a virtual container. For this reason, first, the current container resource access mode needs to be changed. For example, in a text container, the text element originally accesses the corresponding text resource inside the container directly through the index. Currently, the text element gets the corresponding container through a text container memory to access the resource corresponding to the container, as shown in FIG. 7E.

In this case, the index of the resource in the text container is stored inside the text element, but the corresponding text container is accessed through the text container memory. In order to obtain the text container of the corresponding webpage in the text container memory, the concept of data version is introduced in the webpage. The data version is an integer used to establish a corresponding relationship between the webpage tree structure and the container structure. During the pre-reading process, every operation of pre-reading "Previous Page" uses an increment data version, so that the different sub-page data structures are separated through the data version when the webpages are merged.

Figure 7F:
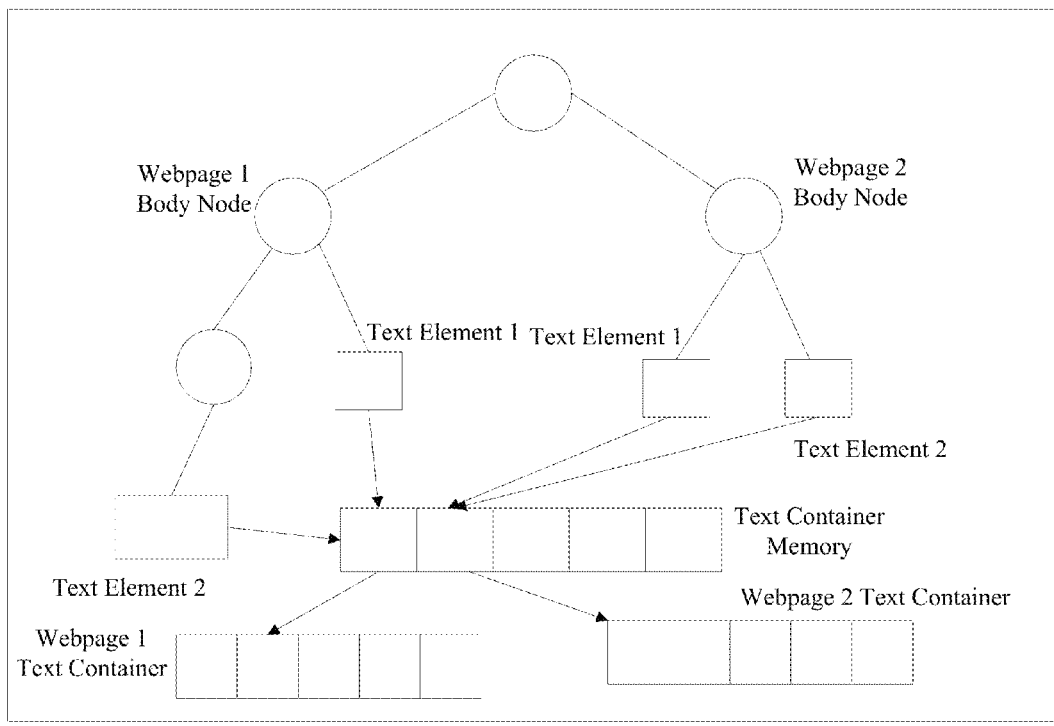

As shown in FIG. 7F, when a text element needs to access the corresponding text resource, it needs to access the text container corresponding to the data version from the text container memory by using the data version, and then fetch the corresponding text resource from the text container through the resource index.

Similarly, in one or more alternative examples in the present embodiment, according to the present embodiment, the webpage reading apparatus 200 may also include a webpage reading determining unit (not shown in FIG. 5). The webpage reading determining unit is configured, based on an input URL, to determine whether the webpage contents to be loaded are suitable for reading. In addition, only when the webpage reading determining unit determines that the webpage contents to be loaded are suitable for reading, the pre-reading keyword detecting unit 530 starts to detect whether pre-reading keywords are included in an HTML file or DOM.

In addition, in one or more alternative examples in the present embodiment, according to the present embodiment, the webpage reading apparatus 200 may also include a rearrangement unit (not shown in FIG. 5). After loading the webpage contents on a mobile terminal, and before displaying the webpage contents on the mobile terminal, the rearrangement unit automatically rearranges the webpage contents to be displayed based on parameters of the mobile terminal. For example, based on the width, height and resolution of the display screen of a mobile terminal, the rearrangement unit rearranges the webpage contents to be displayed, making the rearranged webpage suitable for the width of the display screen of the mobile terminal. In addition, the rearrangement unit may also include an annotation unit (not shown in FIG. 5). The annotation unit is configured to label content having a hyperlink in the displayed webpage using an annotation symbol. Only when the content labeled by the annotation symbol is clicked, the display unit 520 displays the URL corresponding to the hyperlink in the labeled content at the bottom of the display screen.

In addition, in one or more examples in the above embodiment, the splice unit 560 may also include a filtering module (not shown in FIG. 5). The filtering module is configured to filter the pre-reading keyword in the currently displayed last webpage and the webpage contents below the pre-reading keyword. After filtering, the webpage contents that have been filtered out no longer appear when the webpages are spliced. As used herein, the word filter means hide. That is, the contents still exist but are invisible to the user. When displaying the contents, the pre-reading keyword and the webpage contents below the pre-reading keyword can be hidden, thus improving the user's reading experience.

The following is the description for the implementation of the filtering process. To implement the filtering process, an element needs to support hiding operation. In order to support the hiding operation, a hidden state is added in the webpage element. The hidden element is not laid out and displayed; the hidden element does not also respond to any touch screen event; the hidden element does not get the focus (trackball event). When all the conditions mentioned above are satisfied at the same time, the element is hidden. The hidden element is invisible in the webpage. The position of the hidden element is not vacated, thus the trackball operation does not select the hidden element. The non-hidden elements are the same as the original elements.

During the filtering operation, at the beginning, the filter rectangle is calculated. Specifically, after the webpage is loaded, the "Previous Page" coordinate X0, Y0 (relative to the current webpage) is obtained, thus obtaining a filter rectangle: (0, Y0, PageWidth, PageHeight-Y0). The filter rectangular contains the "Previous Page" and all the following contents. Then, all the filter elements are found out by the filter rectangle and hidden. For example, in the traversal of the webpage tree structure, all the block elements whose y-axis positions locate within the rectangle and inline elements that intersect the rectangle are set to hide, thus implementing the filtering process. Then, a filtered webpage is obtained by re-publishing the webpage. To restore the original page, elements that are marked as hidden state are reset to non-hidden state by traversing the tree structure of the webpage. Then, the hidden elements can be restored by re-publishing the webpage.

In addition, in one or more examples in the above embodiment, the splice unit 560 may also include a setting module (not shown in FIG. 5). The setting module is configured to set a separation pattern between the pre-reading next webpage contents and the currently displayed last webpage.

Figure 8:
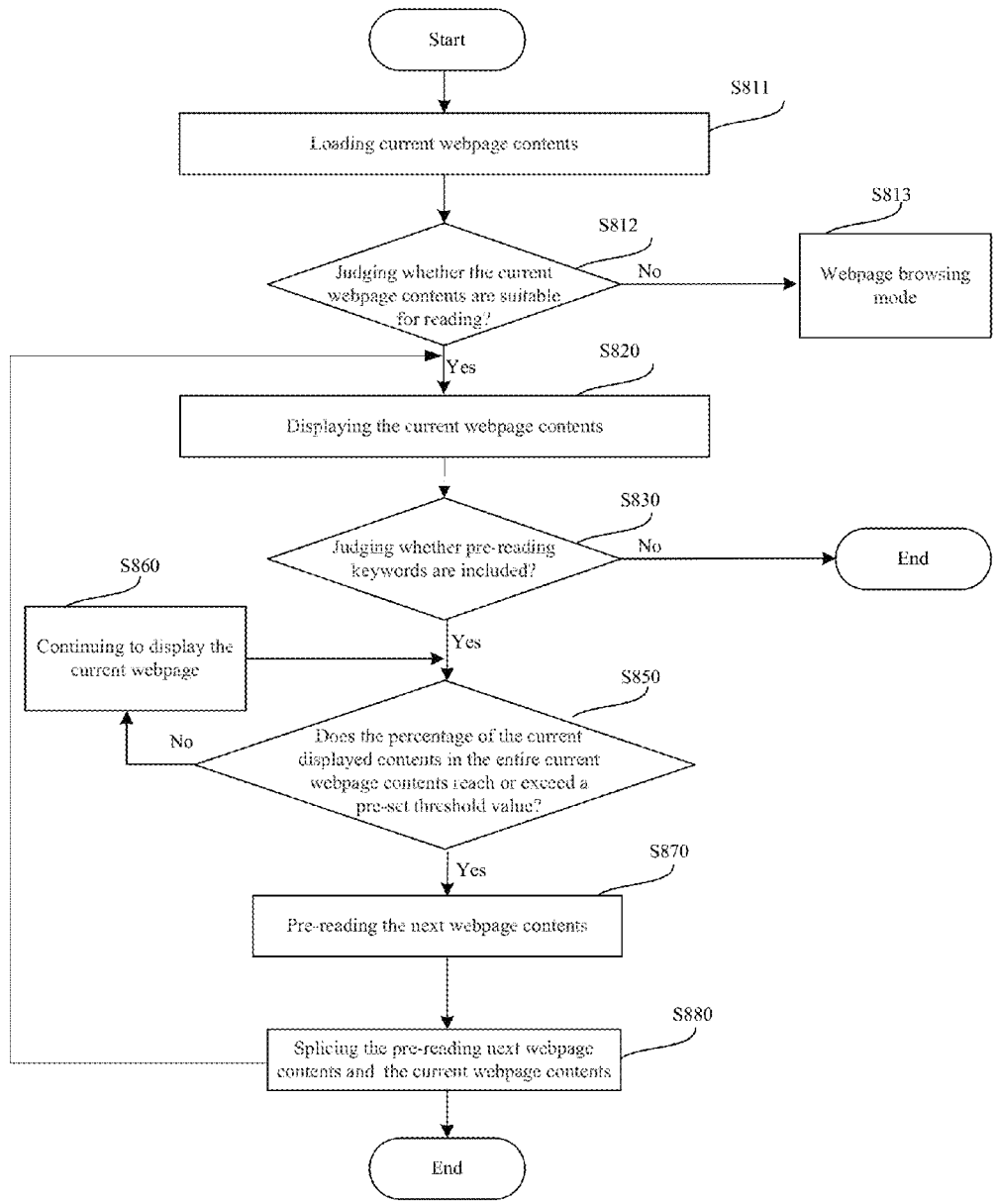
FIG. 8 illustrates a flow chart of an exemplary method that a webpage reading apparatus implements webpage reading on a mobile terminal according to embodiment two of the present invention.

FIG. 8 illustrates a flow chart of another exemplary method that a webpage reading apparatus implements webpage reading on a mobile terminal consistent with the disclosed embodiments.

As shown in FIG. 8, in S811, after inputting a URL of a webpage to be read, the current page loading unit 510 loads the webpage contents corresponding to the URL from a webpage server. Then, in S812, the webpage reading determining unit determines whether the current webpage contents are suitable for reading. If the current webpage contents are suitable for reading, the process goes to S820. If the current webpage contents are not suitable for reading, in S813, the webpage reading apparatus browses webpages by webpage browsing mode and ends the process.

In S820, the loaded webpage contents or the spliced webpage contents are displayed. Then, in S830, the pre-reading keyword detecting unit 530 detects whether pre-reading keywords are included in an HTML file or DOM corresponding to the last webpage URL of the displayed webpage contents. For example, the pre-reading keyword detecting unit detects whether the pre-reading keywords are included in the HTML that describes the displayed webpage. Or the pre-reading keyword detecting unit detects whether pre-reading keywords exists in the generated DOM. In the above example, the next page link is obtained by using the pre-reading keyword//[@_id="next_link"] that links to the specified next page.

If the pre-reading keyword detecting unit detects that at least one pre-reading keyword is included in the HTML file or DOM, the process goes to S850; otherwise, the process goes to S840 and the process is ended.

In S850, when the contents displayed on the display unit are the current webpage contents (i.e. the contents displayed on the display screen are not the spliced pre-reading webpage content), the content display determining unit 540 determines whether the percentage M % of the last webpage of the current contents displayed on the display screen of the mobile terminal with respect to the entire webpage contents of the last webpage reaches or exceeds a pre-set threshold value. Preferably, the pre-set threshold value may be 50%, 60%, 70%, 80% or 90%. As used herein, when the displayed webpage contents are the current webpage contents loaded from the webpage server, the last webpage of the displayed webpage contents is the current webpage. When the displayed webpage contents are the obtained webpage contents after the splicing process is performed, the last webpage of the displayed webpage contents is a recently pre-read webpage.

When the content display determining unit determines that the percentage of the current contents displayed on the display screen in the entire current webpage reaches or exceeds the pre-set threshold value, if the determination result in S850 is YES, in S870, based on the detected pre-reading keyword, the pre-reading unit 550 pre-reads the next webpage contents of the last webpage of the displayed webpage contents from a webpage server according to the URL corresponding to the pre-reading keyword. When the pre-reading keyword detecting unit 530 detects that a webpage contains more than one pre-reading keywords, the pre-reading unit 550 pre-reads the webpage contents of the URL corresponding to the pre-reading keyword with the highest priority.

When the content display determining unit determines that the percentage of the current contents displayed on the display screen in the entire current webpage does not reach the pre-set threshold value, the process goes to S860. In S860, the webpage contents continue to be displayed.

After the pre-reading unit 550 pre-reads and stores the next webpage content, the process goes to S880. In S880, the splice unit splices the pre-reading next webpage contents with the currently displayed last webpage together. That is, the pre-read next webpage is spliced below the currently displayed last webpage. After completing the splicing process, the process goes back to S820.

Figure 9:
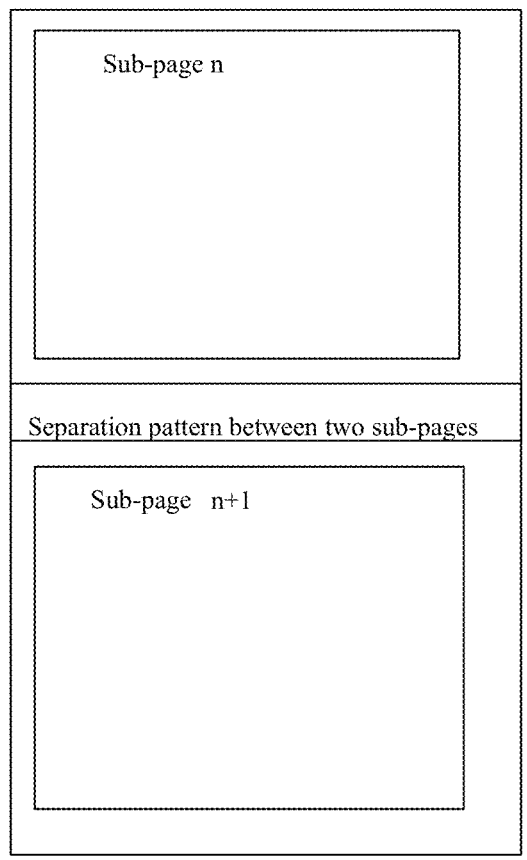
FIG. 9 illustrates a schematic diagram of an exemplary separation pattern between two sub-pages when two sub-pages are spliced together.

It should be noted that, when the splice unit splices the pre-read next webpage contents with the currently displayed last webpage together, as shown in FIG. 9, separation pattern between two sub-pages may be set between the next webpage contents and the currently displayed last webpage. Thus, a user may recognize that the displayed webpage is the spliced webpage.

In addition, in one alternative embodiment, when the splice unit splices the pre-read next webpage contents with the currently displayed last webpage together in S880, the filtering module may also filter the pre-reading keyword in the currently displayed last webpage and the webpage contents below the pre-reading keyword. During displaying the contents, the pre-reading keyword and the webpage contents below the pre-reading keyword are hidden. FIG. 10 shows partial contents to be filtered of a webpage, that is, the part surrounded by a solid line.

FIGS. 11A and 11B illustrate a schematic diagram of an exemplary display screen before a webpage is spliced and filtered, and after a webpage is spliced and filtered, respectively. By comparing FIG. 11A with FIG. 11B, it can be seen, the part surrounded by the solid line in FIG. 11A is hidden in FIG. 11B. In FIG. 11B, separation pattern is set between two sub-pages, such as part surrounded by a solid line.

FIGS. 12A and 12B illustrate a schematic diagram of an exemplary display screen before a webpage is spliced and filtered, and after a webpage is spliced and filtered, respectively. Similarly, the part surrounded by the solid line in FIG. 12A is hidden in FIG. 12B. In FIG. 12B, separation pattern is set between two sub-pages, such as the part surrounded by a solid line.

In the above-described embodiments, splicing the pre-read webpages avoids performing page-turning operations when a user reads webpages. In addition, the filtering module filters the pre-reading keyword in the currently displayed last webpage and the webpage contents below the pre-reading keyword. During displaying the contents, the pre-reading keyword and the webpage contents below the pre-reading keyword can be hidden, thus improving the user's reading experience.

FIG. 13 illustrates a block diagram of a mobile terminal 10 with a webpage reading apparatus 100/200 consistent with the disclosed embodiments. As shown in FIG. 13, the webpage reading apparatus 100/200 may include the above webpage reading apparatus and various alternations. In addition, the webpage reading apparatus 100/200 may be a part of a browser of a mobile terminal, or reside in a browser.

Typically, the mobile terminal described in the present invention may be a variety of terminal devices that can browse webpages, such as mobile phones, personal digital assistants (PDA), etc. Therefore, the scope of the present invention should not be limited to a particular type of mobile terminal.

In addition, the disclosed methods may be implemented in CPU-executable computer programs. When executed by the CPU, the computer programs perform the functions of the disclosed methods.

In addition, the above method steps and system units can be realized by a controller or processor, and by computer-readable storage medium storing computer programs capable of making the controller or processor to implement the above method steps or system units.

In addition, it should be understood that the computer-readable storage medium (e.g., memory) can be volatile memory or nonvolatile memory, or can include volatile memory and nonvolatile memory. As a non-limiting example, nonvolatile memory can include read-only memory (ROM), programmable ROM (PROM), electrically programmable ROM (EPROM), electrically erasable programmable ROM (EEPROM), or flash memory. Volatile memory can include random access memory (RAM). The RAM can act as external cache memory. As another non-limiting example, the RAM can be obtained in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage medium is including but not limited to these and other suitable types of memory.

Those skilled in the art also understand that, the disclosed logic blocks, modules, circuits, and algorithm steps can be implemented in electronic hardware, computer software, or a combination thereof. In order to clearly illustrate this interchangeability between hardware and software, functions of a variety of schematic components, boxes, modules, circuits, and steps are generally described. Whether the functions are implemented in software or hardware depends on the specific application and design constrains applied to the entire system. Those skilled in the art can, for each specific application, use a variety of ways to realize the described functions. However, such realization decision should not be interpreted as departing from the scope of the present invention.

The various illustrative logic blocks, modules, and circuits described here can be designed to use the following components performing the disclosed functions: general-purpose processor, digital signal processor (DSP), application specific integrated circuits (ASICs), field programmable gate array (FPGA) or other programmable logic device, discrete gate or transistor logic, discrete hardware components, or any combination of these components. General-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configuration.

The disclosed methods or algorithm steps may be embodied in hardware, software modules executed by the processor, or a combination of both. The software module can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

Although the previously disclosed information illustrates exemplary embodiments of the present invention, it should be noted, however, various changes and modifications can be made without departing from the scope of the present invention defined in the claims. According to the embodiments of the present invention, the functions, steps and/or actions in the method claims are not required to be executed in a particular order. In addition, although the elements of the present invention may be described or requested individually, they can also be assumed to be plural, unless they are clearly limited to a single number.

The above describes the exemplary webpage reading based on mobile terminal method and apparatus in reference to the accompanying drawings. Those skilled in the art would understand that various improvements can be made the basis of the disclosed web page pre-reading and integrated browsing methods and systems without departing from the contents of the present invention. The scope of the present invention should be defined by the specification, drawings, as well as the attached claims.

What is claimed is:

1. A method for webpage reading based on mobile terminal, comprising:
based on a received web address, loading current webpage contents corresponding to the web address from a webpage server and displaying the loaded webpage contents;
when detecting that a pre-reading keyword is included in an obtained hypertext markup language (HTML) file or document object model (DOM) corresponding to the web address, determining whether a percentage of contents displayed on a display screen of a mobile terminal with respect to entire current webpage contents reaches or exceeds a pre-set threshold value;

when the percentage of the displayed contents with respect to the entire current webpage contents reaches or exceeds the pre-set threshold value, pre-reading and caching next webpage contents based on the web address associated with the pre-reading keyword; and when a pre-set condition of displaying the next webpage contents is satisfied, displaying the cached next webpage contents, including:

automatically rearranging the webpage contents to be displayed based on parameters of the mobile terminal, labeling content having a hyperlink in the displayed webpage using an annotation symbol, and when the webpage contents are displayed, if the content labeled by the annotation symbol is clicked, displaying a linked web address corresponding to the hyperlink in the labeled content at the bottom of the display screen.

2. The method according to claim 1, before loading and displaying the current webpage contents corresponding to the input web address, further including:

based on the input web address, determining whether the current webpage contents to be loaded are suitable for reading; and only when the current webpage contents to be loaded are suitable for reading, starting to detect the pre-reading keyword.

3. The method according to claim 1, wherein the pre-set condition of displaying the next webpage contents includes:

completing the display of the current webpage contents and clicking on the pre-reading keyword displayed at the bottom of the current webpage; or completing the display of the current webpage contents and making a page-turning motion when the display screen of the mobile terminal is a touch screen; or operating a button on the mobile terminal for page-turning operations.

4. The method according to claim 3, wherein:

the webpage contents displayed on the display screen of the mobile terminal include a title, a display window and body content; and when the pre-set condition of displaying the next webpage contents is satisfied, only the body content and the title of the next webpage contents to be displayed are updated.

5. The method of claim 1, wherein the pre-set threshold value is selected from a range from 50% to 90%.

6. An apparatus for webpage reading, comprising:

a current page loading unit configured to, based on an input web address, load the current webpage contents corresponding to the web address from a webpage server;

a pre-reading keyword detecting unit configured to, when loading the current webpage contents, detect whether a pre-reading keyword is included in an obtained hypertext markup language (HTML) file or document object model (DOM) corresponding to the web address;

a content display determining unit configured to, when detecting that the pre-reading keyword is included in the HTML file and DOM, determine whether a percentage of contents displayed on a display screen of a mobile terminal with respect to entire current webpage contents reaches or exceeds a pre-set threshold value;

a pre-reading unit configured to, when the percentage of the contents displayed on the display screen of the mobile terminal with respect to entire current webpage contents reaches or exceeds the pre-set threshold value, pre-read the next webpage contents from the webpage server according to the web address corresponding to the pre-reading keyword;

a cache unit configured to cache the pre-read next webpage contents;

a display unit configured to, when a pre-set condition of displaying the next webpage contents is satisfied, display the current webpage contents after loading the current webpage contents and display the cached next webpage contents;

a webpage reading determining unit configured to, based on the input web address, determine whether the current webpage contents to be loaded are suitable for reading, wherein only when the webpage reading determining unit determines that the webpage contents to be loaded are suitable for reading, the pre-reading keyword detecting unit starts to detect whether the pre-reading keyword is included in the HTML file and DOM; and a rearrangement unit configured, before displaying the webpage contents on the mobile terminal, to automatically rearrange the webpage contents to be displayed based on parameters of the mobile terminal, wherein the rearrangement unit also includes an annotation unit configured to label content having a hyperlink in the displayed webpage using an annotation symbol, wherein only when the content labeled by the annotation symbol is clicked, the display unit displays the web address corresponding to the hyperlink in the labeled content at the bottom of the display screen.

7. A method for webpage reading based on mobile terminal, comprising:

based on a received web address, loading current webpage contents corresponding to the web address from a webpage server;

performing repeatedly the following operations until a pre-reading keyword is not detected in a hypertext markup language (HTML) file or document object model (DOM) corresponding to the web address of the last webpage of displayed webpage contents:

displaying loaded or spliced webpage contents;

detecting whether the pre-reading keyword is included in the HTML file or DOM corresponding to the web address of the last webpage of the displayed webpage contents;

when the pre-reading keyword is included in the HTML file or DOM, determining whether a percentage of displayed contents of the last webpage of the displayed webpage contents with respect to entire current webpage contents of the last webpage reaches or exceeds a pre-set threshold value;

when the percentage of displayed contents with respect to the entire webpage contents reaches or exceeds the pre-set threshold value, pre-reading the contents of the next webpage of the displayed last webpage based on a web address associated with the pre-reading keyword;

splicing the pre-reading next webpage contents and the currently displayed last webpage;

automatically rearranging the webpage contents to be displayed based on parameters of the mobile terminal;

labeling content having a hyperlink in the displayed webpage using an annotation symbol; and when the webpage contents are displayed, if the content labeled by the annotation symbol is clicked, displaying a linked web address corresponding to the hyperlink in the labeled content at the bottom of the display screen.

8. The method according to claim 7, wherein splicing the pre-reading next webpage contents and the currently displayed last webpage further includes:
   filtering a pre-reading keyword in the currently displayed last webpage and the webpage contents below the pre-reading keyword.

9. The method according to claim 7, wherein splicing the pre-reading next webpage contents and the currently displayed last webpage further includes:
   setting a separation pattern between the pre-reading next webpage contents and the currently displayed last webpage.

10. An apparatus for webpage reading, comprising:
   a current page loading unit configured to load current webpage contents corresponding to an received web address from a webpage server based on the received web address;
   a display unit configured to display loaded or spliced webpage contents;
   a pre-reading keyword detecting unit configured to detect whether a pre-reading keyword is included in a hypertext markup language (HTML) file or document object model (DOM) corresponding to the web address of a last webpage of the displayed webpage contents;
   a content display determining unit configured to, when the pre-reading keyword is included in the HTML file or DOM, determine whether a percentage of displayed contents of the last webpage of the webpage contents to be displayed with respect to entire current webpage contents of the last webpage reaches or exceeds a pre-set threshold value;
   a pre-reading unit configured to, when the percentage of displayed contents with respect to the entire webpage contents reaches or exceeds the pre-set threshold value, pre-read the contents of the next webpage of the displayed last webpage based on the web address associated with the pre-reading keyword;
   a splicing unit configured to splice the pre-reading next webpage contents and the currently displayed last webpage, wherein the pre-reading keyword detecting unit detects repeatedly the displayed webpage contents until the pre-reading keyword is not detected;
   a webpage reading determining unit configured to, based on the received web address, determine whether the current webpage contents to be loaded are suitable for reading, wherein only when the webpage reading determining unit determines that the webpage contents to be loaded are suitable for reading, the pre-reading keyword detecting unit starts to detect whether the pre-reading keyword is included in the HTML file and DOM; and
   a rearrangement unit configured, before displaying the webpage contents on the mobile terminal, to automatically rearrange the webpage contents to be displayed based on parameters of the mobile terminal, wherein the rearrangement unit also includes an annotation unit configured to label content having a hyperlink in the displayed webpage using an annotation symbol, wherein only when the content labeled by the annotation symbol is clicked, the display unit displays the web address corresponding to the hyperlink in the labeled content at the bottom of the display screen.

11. The apparatus according to claim 10, wherein the splicing unit further includes:
   a filtering module configured to filter the pre-reading keyword in the currently displayed last webpage and the webpage contents below the pre-reading keyword.

12. The apparatus according to claim 9, wherein the splicing unit further includes:
   a setting module configured to set a separation pattern between the pre-reading next webpage contents and the currently displayed last webpage.

13. A mobile terminal, comprising:
   an apparatus for webpage reading according to claim 6.

14. The method according to claim 8, wherein splicing the pre-reading next webpage contents and the currently displayed last webpage further includes:
   setting a separation pattern between the pre-reading next webpage contents and the currently displayed last webpage.

15. The apparatus according to claim 10, wherein the splicing unit further includes:
   a setting module configured to set a separation pattern between the pre-reading next webpage contents and the currently displayed last webpage.

16. A mobile terminal, comprising an apparatus for webpage reading according to claim 10.

* * * * *